(12) United States Patent
Muthiah (10) Patent No.: US 11,429,296 B2
(45) Date of Patent: Aug. 30, 2022

(54) STORAGE SYSTEM, HOST, AND METHOD FOR EXTENDED AND IMAGINARY LOGICAL-TO-PHYSICAL ADDRESS MAPPING

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 3 days.

(21) Appl. No.: 16/889,383

(22) Filed: Jun. 1, 2020

(65) Prior Publication Data

US 2021/0373765 A1    Dec. 2, 2021

(51) Int. Cl.
*G06F 3/06* (2006.01)

(52) U.S. Cl.
CPC ............ *G06F 3/064* (2013.01); *G06F 3/0617* (2013.01); *G06F 3/0644* (2013.01); *G06F 3/0652* (2013.01); *G06F 3/0659* (2013.01); *G06F 3/0665* (2013.01); *G06F 3/0679* (2013.01)

(58) Field of Classification Search
CPC ...... G06F 3/064; G06F 3/0617; G06F 3/0644; G06F 3/0652; G06F 3/0659; G06F 3/0665; G06F 3/0679
See application file for complete search history.

(56) References Cited

U.S. PATENT DOCUMENTS

| | | | |
|---|---|---|---|
| 5,557,770 A | 9/1996 | Bhide et al. | |
| 6,678,785 B2 | 1/2004 | Lasser | |
| 8,195,912 B2 | 6/2012 | Flynn et al. | |
| 9,396,103 B2 | 7/2016 | Sinclair et al. | |
| 2019/0035473 A1* | 1/2019 | Rajamani | G06F 3/0679 |
| 2019/0347197 A1* | 11/2019 | Lee | G06F 12/0253 |
| 2021/0173785 A1* | 6/2021 | Jin | G06F 12/0873 |

* cited by examiner

*Primary Examiner* — Eric Cardwell
(74) *Attorney, Agent, or Firm* — Crowell & Moring LLP (57) ABSTRACT

A storage system, host, and method for extended and imaginary logical-to-physical address mapping are provided. In one embodiment, a host maps logical block addresses of a plurality of random data to a sequential set of imaginary logical addresses that extend beyond a logical capacity of a memory in a storage system. The host sends a request to the storage system to write the plurality of random data in the sequential set of imaginary logical addresses. Other embodiments are provided.

20 Claims, 7 Drawing Sheets

STORAGE SYSTEM, HOST, AND METHOD FOR EXTENDED AND IMAGINARY LOGICAL-TO-PHYSICAL ADDRESS MAPPING

BACKGROUND

A host can send read and write requests to a storage system to read data from and store data in a memory of the storage system. Data sent for storage can be random data or sequential data.

DETAILED DESCRIPTION

Overview

By way of introduction, the below embodiments relate to a storage system, host, and method for extended and imaginary logical-to-physical address mapping. In one embodiment, a host is provided comprising an interface configured to communicate with a storage system comprising a memory and a processor. The processor is configured to: map logical block addresses of a plurality of random data to a sequential set of imaginary logical addresses that extend beyond a logical capacity of the memory in the storage system; and send a request to the storage system to write the plurality of random data in the sequential set of imaginary logical addresses.

In some embodiments, the processor is further configured to map the logical block addresses in response to determining that data to be written to the storage system is random and temporary.

In some embodiments, the processor is further configured to use the map to read one of the plurality of random data from the memory of the storage system.

In some embodiments, the processor is further configured to ensure that an aggregate of the sequential set of imaginary logical addresses and real logical addresses is within a physical capacity of the memory.

In some embodiments, the processor is further configured to send, to the storage system, an erase command comprising one of the imaginary logical addresses.

In some embodiments, the processor is further configured to modify a file system to reflect an extended capacity of the memory.

In some embodiments, the plurality of random data are from different applications running on the host.

In another embodiment, a storage system is provided comprising a memory and a controller. The controller is configured to: receive a request from a host to write a plurality of random data in a sequential set of imaginary logical addresses that extend beyond a logical capacity of the memory in the storage system; and store the plurality of random data in different physical blocks of memory designated for temporary data storage.

In some embodiments, the controller is further configured to forego garbage collection on the different physical blocks.

In some embodiments, the controller is further configured to erase one of the plurality of random data in response to receiving an erase command from the host, wherein the erase command comprises one of the imaginary logical addresses.

In some embodiments, the controller is further configured to modify a file system to reflect an extended capacity of the memory.

In some embodiments, the plurality of random data are from different applications running on the host.

In some embodiments, the memory comprises a three-dimensional memory.

In another embodiment, a host is provided comprising: means for aggregating a set of random data into a set of sequential data; means for associating a sequential set of imaginary logical addresses that extend beyond a logical capacity of a memory in a storage system with the set of sequential data; and means for sending a request to the storage system to write the set of sequential data in the sequential set of imaginary logical addresses.

In some embodiments, the storage system further comprises means for maintaining a map of real logical block addresses of the set of random data and the sequential set of imaginary logical addresses.

In some embodiments, the storage system further comprises means for using the map to read one of the set of random data from the memory of the storage system.

In some embodiments, the storage system further comprises means for ensuring that a sum of real logical block addresses of the set of random data and the sequential set of imaginary logical addresses is within a physical capacity of the memory.

In some embodiments, the storage system further comprises means for sending an erase command to the storage system, wherein the erase command comprises one of the imaginary logical addresses.

In some embodiments, the storage system further comprises means for modifying a file system to reflect an extended capacity of the memory.

In some embodiments, the plurality of random data are from different applications running on the host.

Other embodiments are possible, and each of the embodiments can be used alone or together in combination. Accordingly, various embodiments will now be described with reference to the attached drawings.

Embodiments

Figures 1A, 1B:
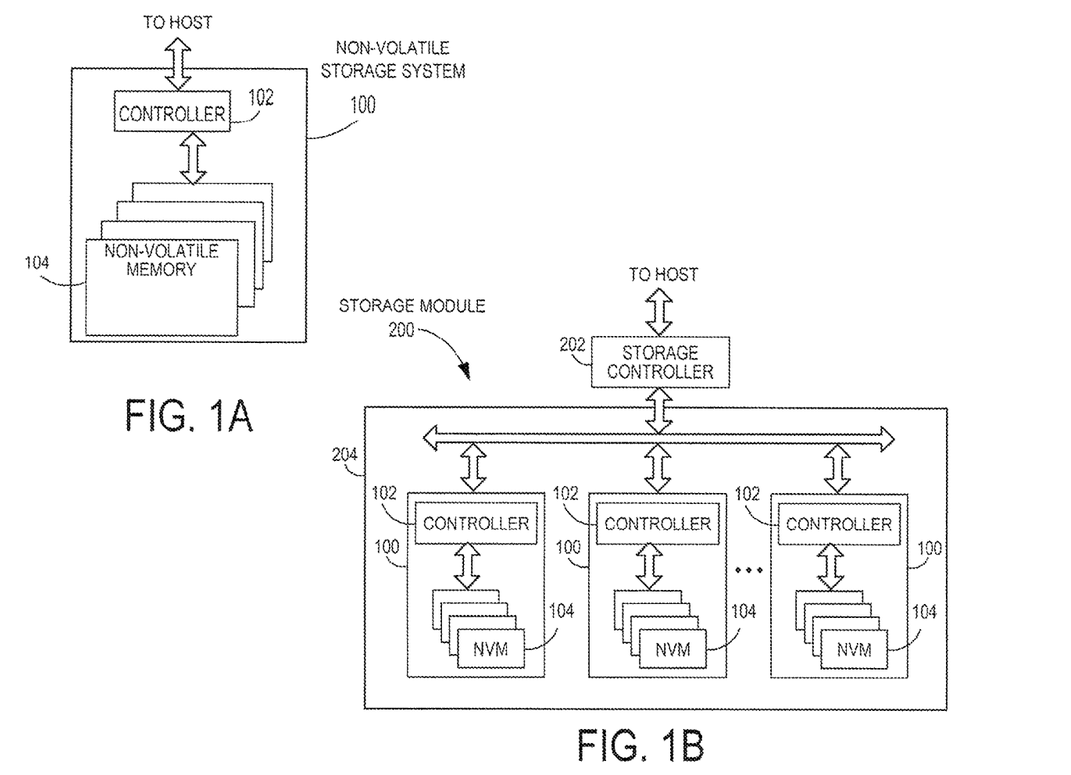
FIG. 1A is a block diagram of a non-volatile storage system of an embodiment.
FIG. 1B is a block diagram illustrating a storage module of an embodiment.
Figure 1C:
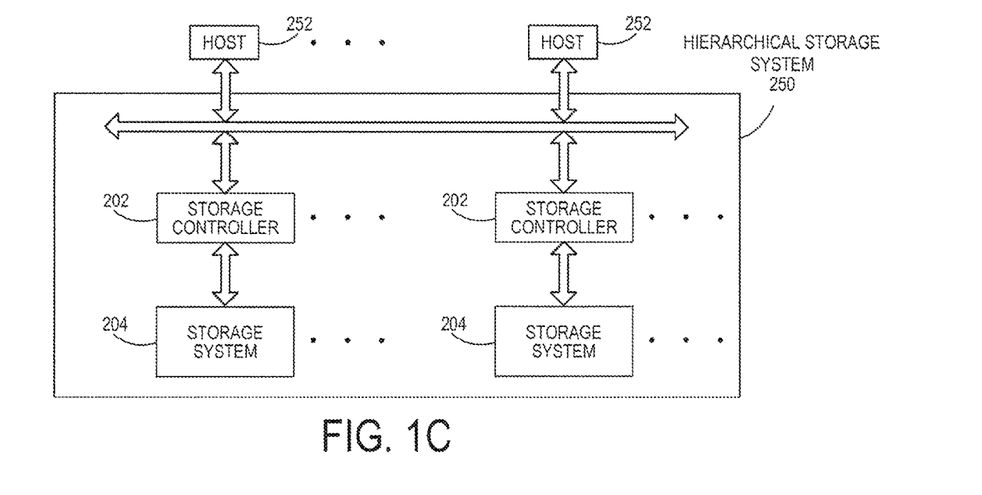
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
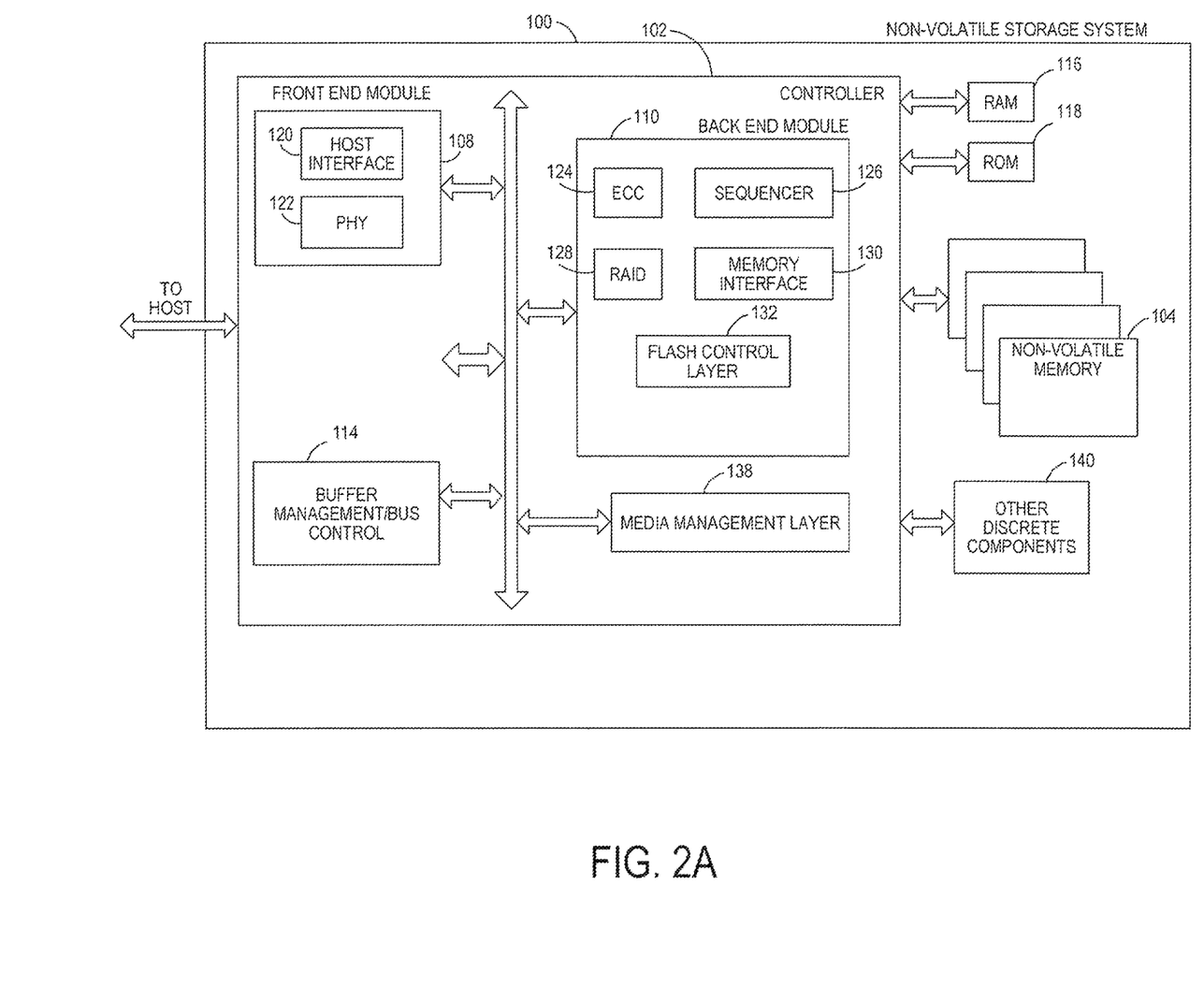
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
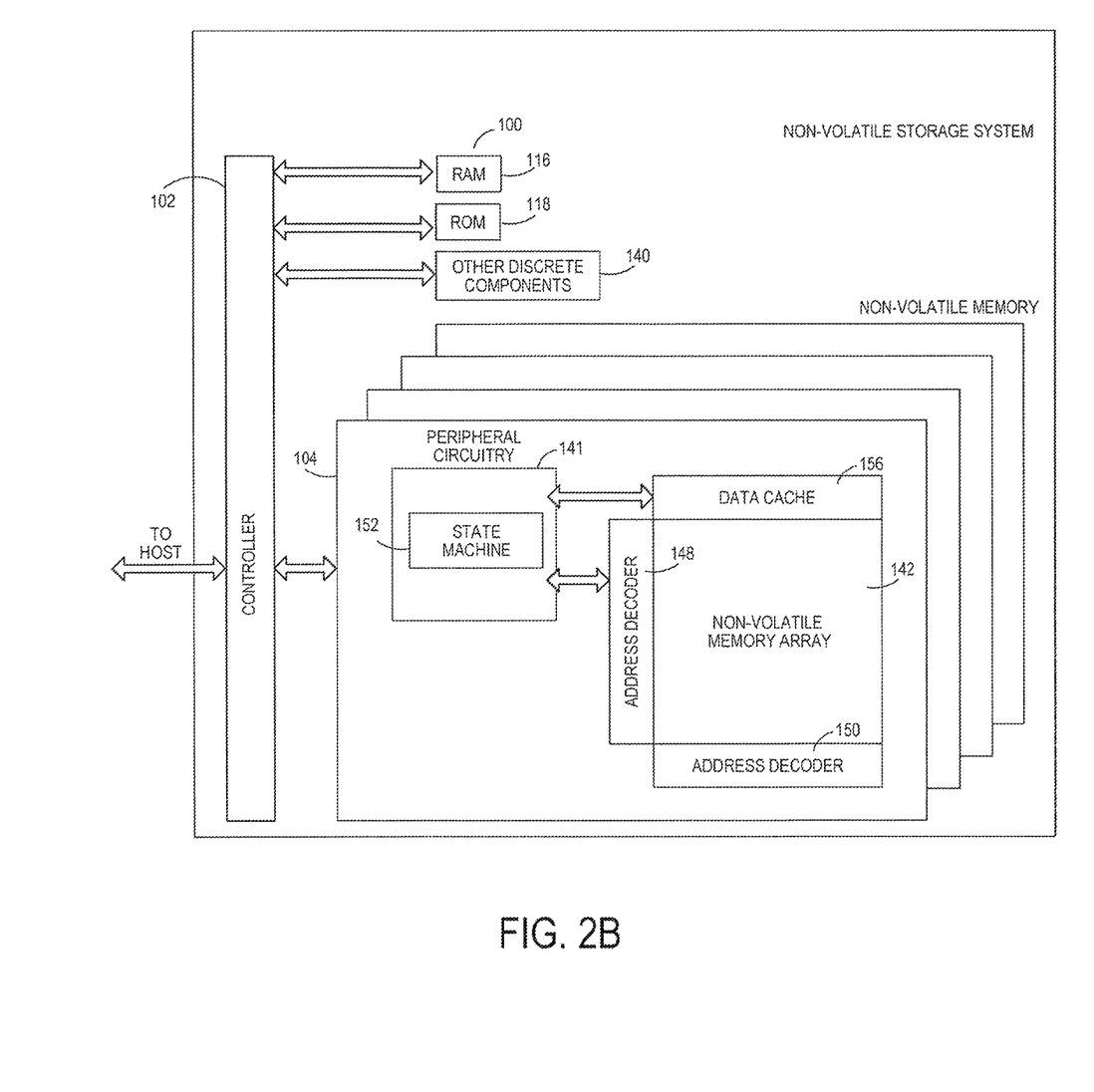
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
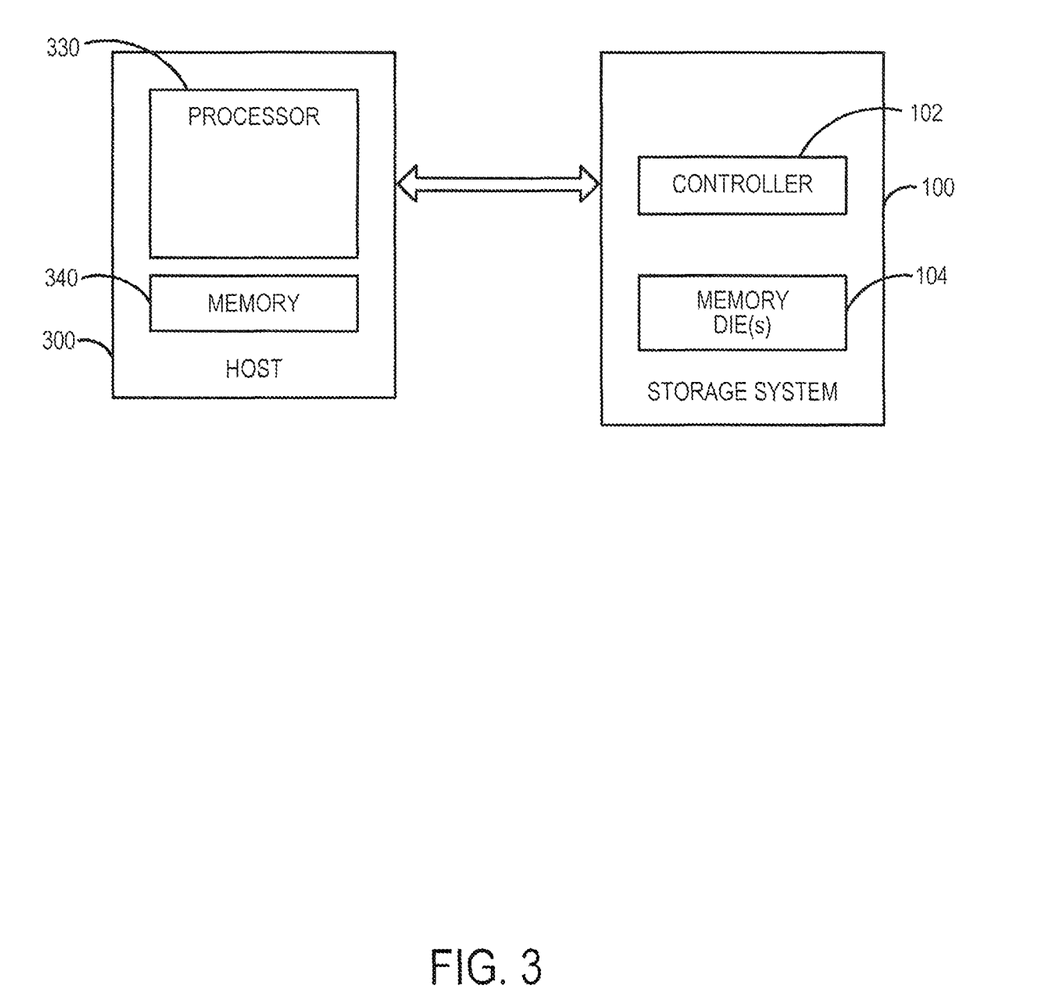
FIG. 3 is a block diagram of a host and storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the random data aggregation and mapping discussed below.

The input-output patterns used in the storage system 100 can vastly affect the storage system's performance. In general, the storage system 100 performs better reading and writing sequential data than random data, but it is not always possible to generate such a workload. Typically, if the data to be written is random, then the host chooses to write random data. From the storage system's perspective, the storage system 100 sees the random writes as multiple, smaller commands sparsely populated in the logical mapping. However, the storage system 100 can encounter performance issues due to an increased number of accesses to the logical-to-physical address map. Such increased accesses can also lead to increased write amplification. From a software perspective, if the input-output pattern can be optimized in the storage system 100 as a whole, the performance and life of the memory 104 can increase substantially. In practical application, it is difficult to write data in a full sequential pattern. However, the following embodiments can be used to provide sequential writes to some extent.

In one embodiment, there is a predetermined agreement between the host 300 and the storage system 100 to handle data that the host 300 wants to write and read as temporary random data. This embodiment can be used to optimize host writes in the storage system 100, reducing the amount of accesses to a logical-to-physical address map/table, and optimum read time. In general, with these embodiments, the host 300 aggregates a set of random data into a set of sequential data. To do this, the processor 330 in the host 300 can map logical block addresses of a plurality of random data to a sequential set of imaginary logical addresses that extend beyond a capacity of the memory 104 in the storage system 100. When the storage system 100 gets the request, it can store the random data in different physical blocks designated for temporary data.

Figure 4:
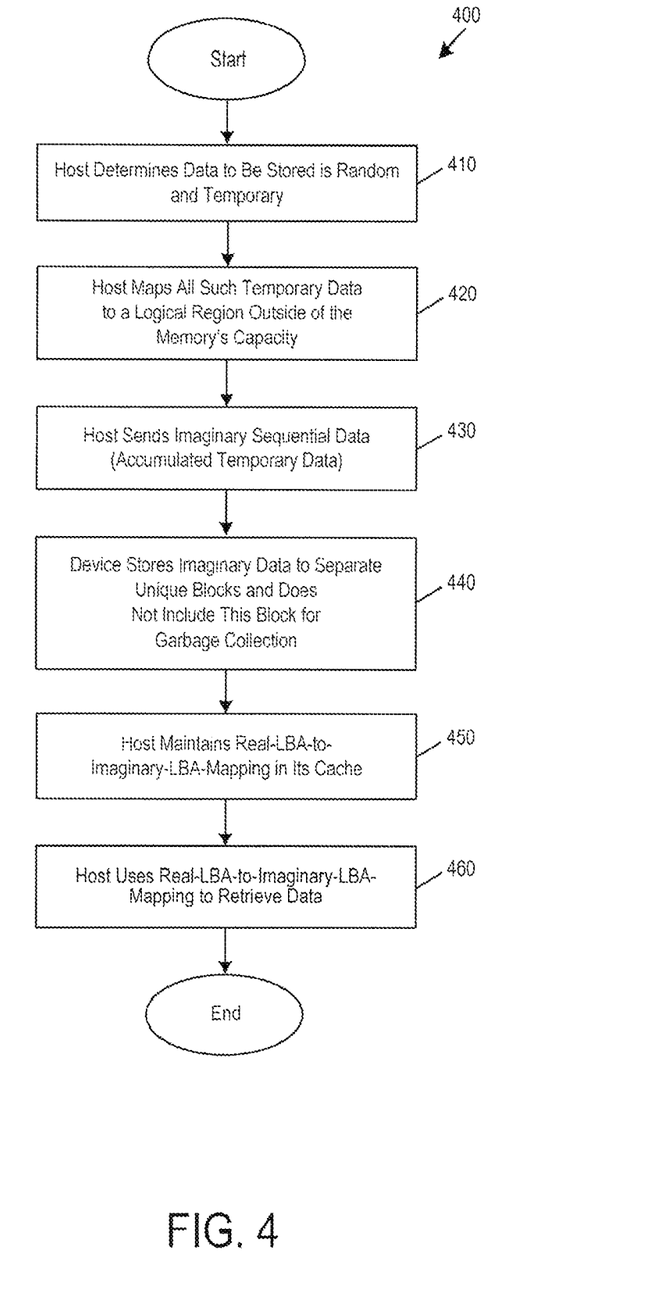
FIG. 4 is a flow chart of a method of an embodiment for extended and imaginary logical-to-physical address mapping.

FIG. 4 is a flow chart 400 of a method of an embodiment. In this method, the host 300 first determines that it wants to write and read random data temporarily (act 410). In response to this determination, the host 300 aggregates (clubs) together multiple random data as an entity for writing, so it can send one sequential write command to the storage system 100. To do this, the host 300 can map the random (temporary) data to a logical region outside of the memory's capacity (act 420). In some cases, the host 300 can separately club random data from different applications and send them as separate commands based on the life span requirement of the data from each application.

Figure 5A:
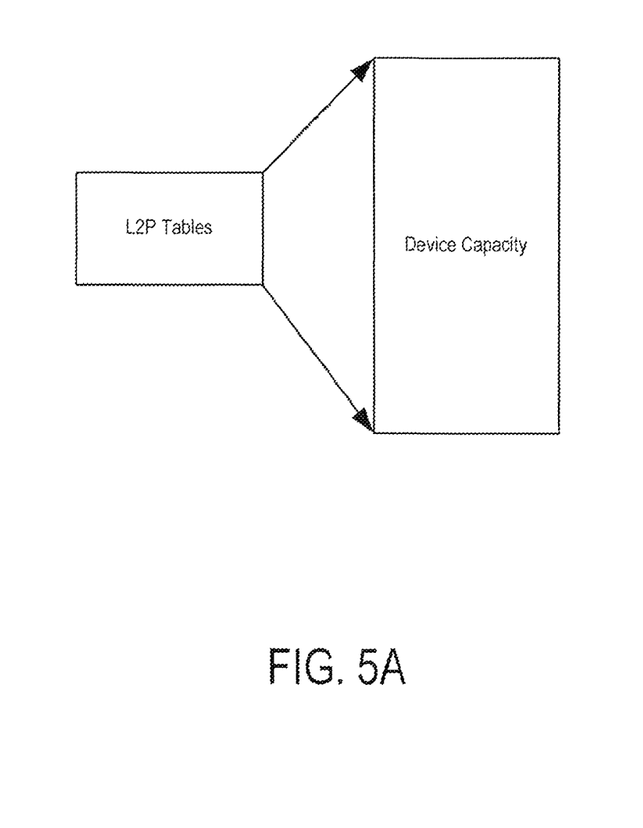
FIGS. 5A and 5B illustrate real and extended capacity of a memory of an embodiment.
Figure 5B:
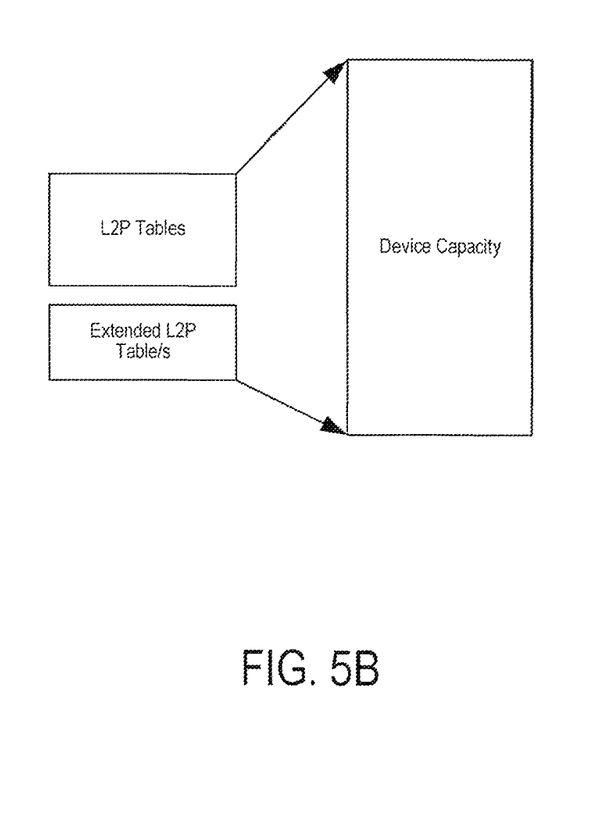
Figure 6A:
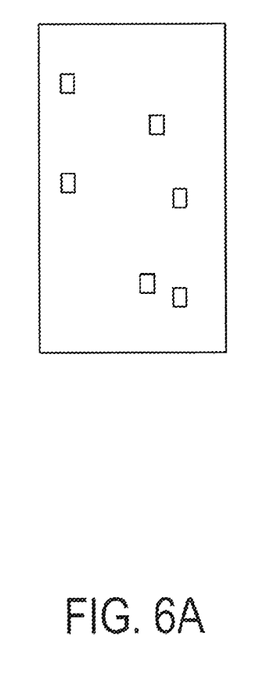
FIGS. 6A and 6B illustrate storing random data in real and imaginary locations of a memory of an embodiment.
Figure 6B:
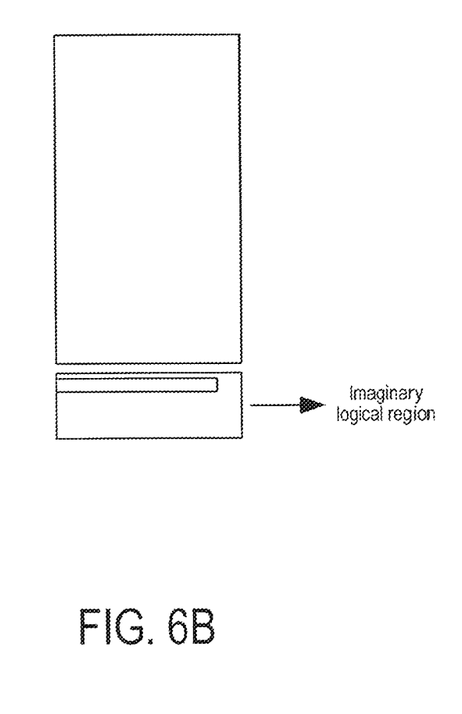

The host 300 associates the resultant sequential data to an extended logical address within the physical capacity of the memory 104 so as to not disturb the existing capacity region. FIG. 5A shows a typical logical-to-physical mapping scheme used by the storage system 100. As shown in FIG. 5A, the mapping covers the entirety of the memory device's capacity. As shown in FIG. 6A, this mapping results in random data being disbursed in the logical map. In contrast, as shown in FIG. 5B, in the extended addressing scheme, the extended logical-to-physical address table(s) contain entries of an imaginary logical region beyond the physical capacity of the memory 104. However, the host 300 can ensure the total of the real and imaginary addresses is less than the actual physical capacity of the memory 104. As shown in FIG. 6B, this mapping results in the random data being sequenced together in continuous addresses in the logical map. Again, this imaginary logical region does not result in an actual gain or loss of storage space in the memory 104. It just results in the random data being stored in one contiguous logical area versus in several non-contiguous logical areas. The host 300 can maintain a local map of the real logical block addresses to their imaginary sequential counterparts, so the host 300 can later know where to read the data. If the map is stored in volatile memory in the host 300, the map can be maintained until a host power cycle clears that memory cache. Additionally, the host 300 can modify a file system to reflect the extended capacity of the memory 104 even though the memory 104 does not, in fact, have higher capacity.

Returning to FIG. 4, after the host 300 sends a request to the storage system 100 to store the random data in the imaginary logical addresses (act 430), the storage system 100 streams the random data into different physical blocks of memory 104 designated for temporary (short lived) data storage (act 440). In one embodiment, the storage system 100 foregoes garbage collection on the different physical blocks. So, there can be two types of data stored in the memory 104—real logical data and imaginary logical data (constructed from multiple real random data). As mentioned above, the host 300 can make sure the aggregate of the real and imaginary logical data is within the memory's physical capacity. Although it looks like more blocks are required to be budgeted for logical-to-physical translation owing to the larger virtual capacity, over the long run, it will average out since this embodiment reduces write amplification by avoiding holes in logical-to-physical tables from random writes. As mentioned above, the host 300 can update the file system written into the memory 104 based on whether data is necessary or not beyond the storage system's power cycle.

In some embodiments, the controller 102 of the storage system 100 (instead of the host 300) can perform data clubbing and maintain a sub table of imaginary logical addresses. However, improper shut down of the storage system 100 can lead to confusion, unless a graceful shutdown is guaranteed. Further, the storage system's backend may avoid or treat those fragments with out-of-bounds logical block addresses to make sure they are not moved to capacity blocks and not considered for garbage collection.

As mentioned above, in this embodiment, the host 300 maintains a map of real and imaginary logical addresses (act 450), which it can use to read the data (act 460). On determining that the stored random data is no longer required, the host 300 can send an erase command to the storage system 100 (for the sequential data identified by an address in the imaginary logical region outside capacity, as well as for the real random data identified by an address in the real logical region).

There are several advantages associated with these embodiments. For example, using these embodiments can optimize host writes as random data is stored as sequential data. These embodiments can result in fewer accesses to a logical-to-physical address table since control overhead with sequential writes is much less. Also, less background work is needed since the storage system 100 routes the short-lived data into separate physical blocks. These embodiments can also optimize read time since all the random data is segregated under a common extended logical address needing only one or a few extended logical-to-physical address tables to access them, compared to typical random access latencies. Further, fewer garbage collection operations are needed since this embodiment avoids holes in the real logical-to-physical address tables.

The following example illustrates some of these advantages. Assume the actual capacity of the memory 104 has 1,024 real logical block addresses (LBA 0 to 1,023). A random write using a typical approach (each write being 8 sectors, with 32 total sectors) is as follows: LBA 256, LBA 32, LBA 96, LBA 768. Using the sequential write in the proposed system, there would be 32 sectors starting from LBA 1,024 (after the real LBA 1,023).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A host comprising:
    an interface configured to communicate with a storage system comprising a non-volatile memory having a maximum logical capacity defined by a first range of logical block addresses; and
    a processor configured to:
        receive a plurality of random write commands, wherein the plurality of random write commands specifies non-contiguous logical block addresses in the first range of logical block addresses in the non-volatile memory at which to store data;
        aggregate the plurality of random write commands into a sequential write command; wherein instead of specifying the non-contiguous logical block addresses in the first range of logical block addresses, the sequential write command specifies contiguous logical block addresses in an extended range outside of the first range of logical block addresses, wherein a first logical block address of the extended range follows a last logical block address of the first range;
        ensure a total of occupied logical block addresses in the first range and the extended range do not exceed an actual physical capacity of the non-volatile memory; and
        send the sequential write command to the storage system.

2. The host of claim 1, wherein the processor is further configured to aggregate the plurality of random write commands in response to determining that data to be written to the storage system is random and temporary.

3. The host of claim 1, wherein the processor is further configured to send, to the storage system, a read command that specifies one of the contiguous logical block addresses outside of the first range of logical block addresses.

4. The host of claim 1, wherein the processor is further configured to send, to the storage system, an erase command specifying one of the contiguous logical block addresses outside of the first range of logical block addresses.

5. The host of claim 1, wherein the processor is further configured to modify a file system to indicate the extended range.

6. The host of claim 1, wherein the plurality of random write commands are from different applications running on the host.

7. The host of claim 1, wherein the non-volatile memory comprises a three-dimensional memory.

8. The host of claim 1, wherein a predetermined agreement exists between the host and the storage system regarding how to handle the sequential write command.

9. The host of claim 1, wherein logical block addresses in the first range are real logical block addresses, and wherein logical block addresses in the extended range are imaginary logical block addresses.

10. A storage system comprising:
a non-volatile memory having a maximum logical capacity defined by a first range of logical block addresses; and
a controller configured to:
receive a sequential write command from a host, wherein the sequential write command specifies contiguous logical block addresses in an extended range outside of the first range of logical block addresses in the non-volatile memory at which to store data, wherein a first logical block address of the extended range follows a last logical block address of the first range;
read a logical-to-physical address data structure that associates logical addresses and physical addresses of blocks in the non-volatile memory, wherein the logical block addresses in the first range of logical block addresses are associated with physical addresses of a first set of blocks in the non-volatile memory and logical block addresses in the extended range outside the first range of logical block addresses are associated with physical addresses of a second set of blocks in the non-volatile memory, wherein a total of occupied logical block addresses in the first range and the extended range do not exceed an actual physical capacity of the non-volatile memory; and
store data from the sequential write command in the second set of blocks in the non-volatile memory.

11. The storage system of claim 10, wherein the controller is further configured to forego garbage collection in the second set of blocks.

12. The storage system of claim 10, wherein the controller is further configured to receive, from the host, an erase command specifying one of the contiguous logical block addresses outside of the first range of logical block addresses.

13. The storage system of claim 10, wherein the controller is further configured to modify a file system to indicate the extended range.

14. The storage system of claim 10, wherein the plurality of random write commands are from different applications running on the host.

15. The storage system of claim 10, wherein the non-volatile memory comprises a three-dimensional memory.

16. The storage system of claim 10, wherein the controller is further configured to receive, from the host, a read command that specifies one of the contiguous logical block addresses outside of the first range of logical block addresses.

17. The storage system of claim 10, wherein the second set of blocks is designated for temporary data.

18. The storage system of claim 10, wherein use of the logical block addresses outside the first range of logical block addresses reduces write amplification.

19. The storage system of claim 10, wherein logical block addresses in the first range are real logical block addresses, and wherein logical block addresses in the extended range are imaginary logical block addresses.

20. A host comprising:
an interface configured to communicate with a storage system comprising a non-volatile memory having a maximum logical capacity defined by a first range of logical block addresses;
means for receiving a plurality of random write commands, wherein the plurality of random write commands specifies non-contiguous logical block addresses in the first range of logical block addresses in the non-volatile memory at which to store data;
means for aggregating the plurality of random write commands into a sequential write command, wherein instead of specifying the non-contiguous logical block addresses in the first range of logical block addresses, the sequential write command specifies contiguous logical block addresses in an extended range outside of the first range of logical block addresses, wherein a first logical block address of the extended range follows a last logical block address of the first range;
means for ensuring a total of occupied logical block addresses in the first range and the extended range do not exceed an actual physical capacity of the non-volatile memory; and
means for sending the sequential write command to the storage system.

* * * * *